United States Patent
Heinrich et al.

(10) Patent No.: US 9,911,018 B1
(45) Date of Patent: Mar. 6, 2018

(54) RFID TAGS WITH DIGITAL SIGNATURE SUBPORTIONS

(71) Applicant: Impinj, Inc., Seattle, WA (US)

(72) Inventors: Harley Heinrich, Snohomish, WA (US); Lawrence F. Arnstein, Seattle, WA (US); Christopher J. Diorio, Shoreline, WA (US)

(73) Assignee: IMPINJ, INC., Seattle, WA (US)

( * ) Notice: Subject to any disclaimer, the term of this patent is extended or adjusted under 35 U.S.C. 154(b) by 418 days.

(21) Appl. No.: 14/030,854

(22) Filed: Sep. 18, 2013

Related U.S. Application Data

(63) Continuation-in-part of application No. 13/349,297, filed on Jan. 12, 2012.

(60) Provisional application No. 61/748,719, filed on Jan. 3, 2013.

(51) Int. Cl.
*H04Q 5/22* (2006.01)
*G06K 7/10* (2006.01)

(52) U.S. Cl.
CPC ................ *G06K 7/10366* (2013.01)

(58) Field of Classification Search
CPC .......... G06K 7/0008; G06K 19/0723; G06K 7/10009; G06K 7/10366; G06K 19/07309; G06K 19/06; G06F 21/10; G06F 21/44; G06F 2221/2107; G08B 21/18; G08B 13/2462; H04W 12/06; H04W 12/12; H04W 16/20; H04W 24/00; H04L 2209/805; H04L 2209/56; H04L 2209/608; H04L 63/08; H04L 63/0838; H04L 9/0861; H04L 9/3228; H04L 9/30; H04L 9/304; H04L 9/3273; H04L 2209/60; H04L 2209/68; H04L 63/0442; H04L 63/068; H04L 63/1441; H04L 9/08; H04L 9/0891
USPC ......... 340/10.1–10.52; 380/277–286, 44–46, 380/29, 255–270; 713/180, 171, 176
See application file for complete search history.

(56) References Cited

U.S. PATENT DOCUMENTS

| | | | |
|---|---|---|---|
| 5,327,570 A | 7/1994 | Foster et al. | |
| 5,832,090 A | 11/1998 | Raspotnik | |
| 5,903,544 A | 5/1999 | Shinohara et al. | |
| 8,149,155 B2 | 4/2012 | Kawai | |
| 8,228,173 B2 | 7/2012 | Missimer et al. | |
| 8,941,469 B1 * | 1/2015 | Diorio et al. ............... | 340/10.1 |
| 9,000,891 B2 | 4/2015 | Daneshmand et al. | |
| 2004/0035919 A1 | 2/2004 | Horng | |
| 2005/0021757 A1 | 1/2005 | Helliwell | |
| 2005/0110640 A1 | 5/2005 | Chung | |
| 2005/0183047 A1 | 8/2005 | Sapiro | |
| 2006/0181397 A1 * | 8/2006 | Limbachiya ........... | G06K 17/00 340/10.51 |
| 2006/0230276 A1 * | 10/2006 | Nochta ........................ | 713/176 |

(Continued)

OTHER PUBLICATIONS

Office Action received for U.S. Appl. No. 13/349,297, dated May 22, 2015 and filed Jan. 12, 2012.

*Primary Examiner* — Emily C Terrell
(74) *Attorney, Agent, or Firm* — Turk IP Law, LLC

(57) ABSTRACT

A Radio Frequency Identification (RFID) tag integrated circuit (IC) stores a subportion of a digital signature and a subportion indicator that may be used to authenticate the IC, a tag including the IC, and/or an item associated with the tag. The subportion of the digital signature is generated, at least in part, by applying a cryptographic function to an identifier associated with the IC, the tag, and/or the item.

20 Claims, 13 Drawing Sheets

(56) References Cited

U.S. PATENT DOCUMENTS

2006/0235805 A1\* 10/2006 Peng .................... G06Q 30/06
                                                    705/76
2006/0273883 A1    12/2006 Pillai et al.
2007/0057768 A1\*   3/2007 Zeng et al. ................ 340/10.1
2007/0230359 A1    10/2007 Tanaka
2008/0211637 A1     9/2008 Smith
2010/0308978 A1\* 12/2010 Brown ..................... 340/10.42

\* cited by examiner

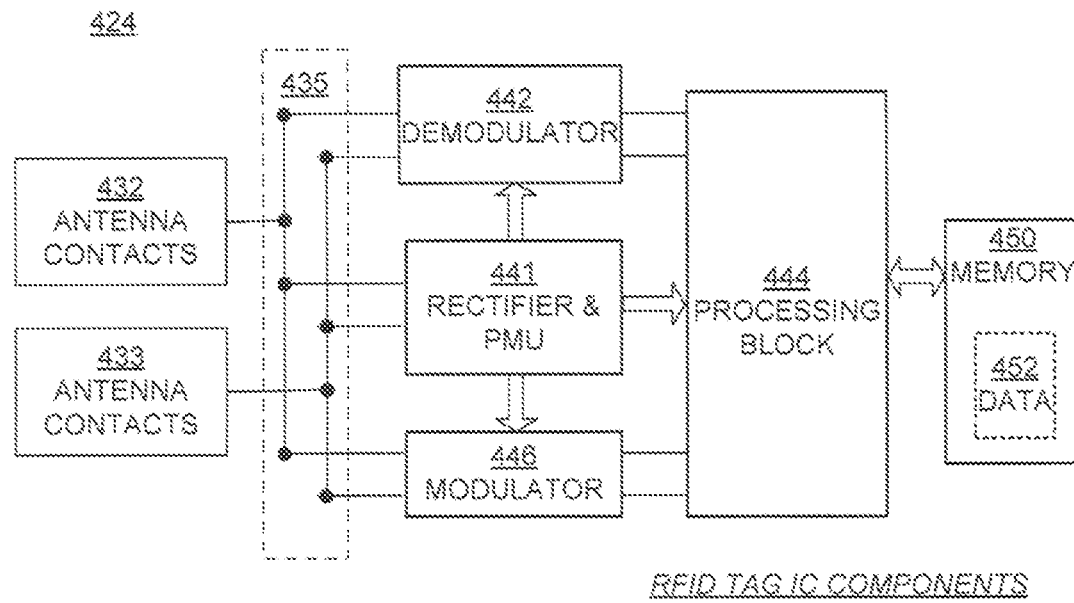
FIG. 4
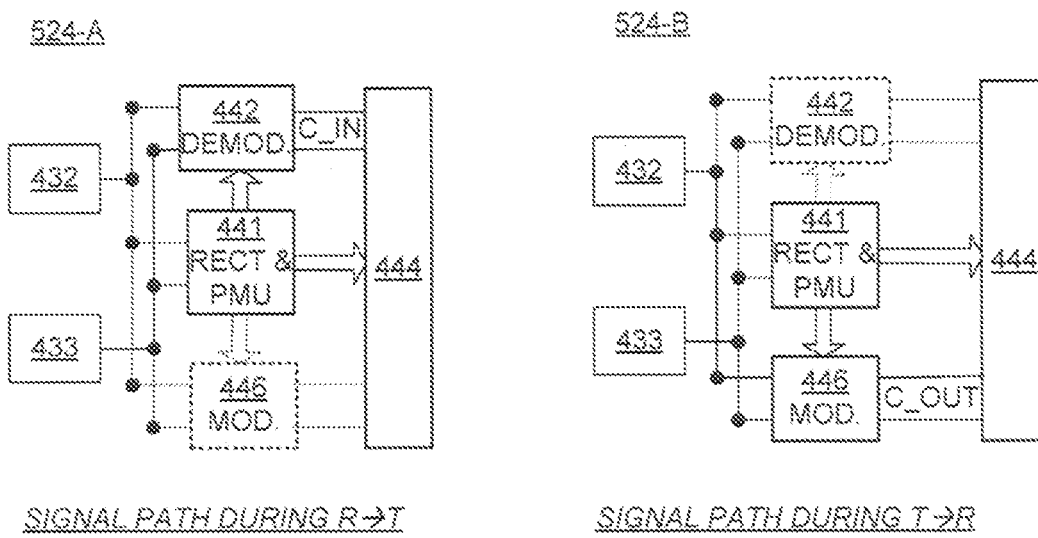
FIG. 5A
FIG. 5B

RFID TAGS WITH DIGITAL SIGNATURE SUBPORTIONS

CROSS-REFERENCE TO RELATED APPLICATIONS

This application is a continuation-in-part of U.S. patent application Ser. No. 13/349,297 filed on Jan. 12, 2012. This application also claims priority to U.S. Provisional Patent Application Ser. No. 61/748,719 filed on Jan. 3, 2013. The disclosures of these patent applications are hereby incorporated by reference for all purposes.

BACKGROUND

Radio-Frequency Identification (RFID) systems typically include RFID readers, also known as RFID reader/writers or RFID interrogators, and RFID tags. RFID systems can be used in many ways for locating and identifying objects to which the tags are attached. RFID systems are useful in product-related and service-related industries for tracking objects being processed, inventoried, or handled. In such cases, an RFID tag is usually attached to an individual item, or to its package.

In principle, RFID techniques entail using an RFID reader to interrogate one or more RFID tags. The reader transmitting a Radio Frequency (RF) wave performs the interrogation. The RF wave is typically electromagnetic, at least in the far field. The RF wave can also be predominantly electric or magnetic in the near field. The RF wave may encode one or more commands that instruct the tags to perform one or more actions.

A tag that senses the interrogating RF wave may respond by transmitting back another RF wave. The tag either generates the transmitted back RF wave originally, or by reflecting back a portion of the interrogating RF wave in a process known as backscatter. Backscatter may take place in a number of ways.

The reflected-back RF wave may encode data stored in the tag, such as a number. The response is demodulated and decoded by the reader, which thereby identifies, counts, or otherwise interacts with the associated item. The decoded data can denote a serial number, a price, a date, a destination, other attribute(s), any combination of attributes, and so on. Accordingly, when a reader receives tag data it can learn about the item that hosts the tag and/or about the tag itself.

An RFID tag typically includes an antenna section, a radio section, a power-management section, and frequently a logical section, a memory, or both. In earlier RFID tags the power-management section included an energy storage device such as a battery. RFID tags with an energy storage device are known as battery-assisted, semi-active, or active tags. Advances in semiconductor technology have miniaturized the electronics so much that an RFID tag can be powered solely by the RF signal it receives. Such RFID tags do not include an energy storage device and are called passive tags. Of course, even passive tags typically include temporary energy- and data/flag-storage elements such as capacitors or inductors.

BRIEF SUMMARY

This summary is provided to introduce a selection of concepts in a simplified form that are further described below in the Detailed Description. This summary is not intended to identify key features or essential features of the claimed subject matter, nor is it intended as an aid in determining the scope of the claimed subject matter.

Embodiments are directed to an RFID tag integrated circuit (IC) that may store a cryptographic identifier used to identify the IC, a tag containing the IC, and/or an item associated with the IC. The cryptographic identifier may be generated by applying a cryptographic function to another identifier associated with the IC, the tag, and/or the item.

These and other features and advantages will be apparent from a reading of the following detailed description and a review of the associated drawings. It is to be understood that both the foregoing general description and the following detailed description are explanatory only and are not restrictive of aspects as claimed.

BRIEF DESCRIPTION OF THE DRAWINGS

The following Detailed Description proceeds with reference to the accompanying drawings, in which:

FIG. 4 is a block diagram showing a detail of an RFID tag, such as the one shown in FIG. 2.

FIGS. 5A and 5B illustrate signal paths during tag-to-reader and reader-to-tag communications in the block diagram of FIG. 4.

DETAILED DESCRIPTION

In the following detailed description, references are made to the accompanying drawings that form a part hereof, and in which are shown by way of illustration specific embodiments or examples. These embodiments or examples may be combined, other aspects may be utilized, and structural changes may be made without departing from the spirit or scope of the present disclosure. The following detailed description is therefore not to be taken in a limiting sense, and the scope of the present invention is defined by the appended claims and their equivalents.

As used herein, "memory" is one of ROM, RAM, SRAM, DRAM, NVM, EEPROM, FLASH, Fuse, MRAM, FRAM, and other similar information-storage technologies as will be known to those skilled in the art. Some portions of memory may be writeable and some not. "Command" refers to a reader request for one or more tags to perform one or more actions. "Protocol" refers to an industry standard for communications between a reader and a tag (and vice versa), such as the Class-1 Generation-2 UHF RFID Protocol for Communications at 860 MHz-960 MHz by EPCglobal, Inc., which is hereby incorporated by reference.

Figure 1:
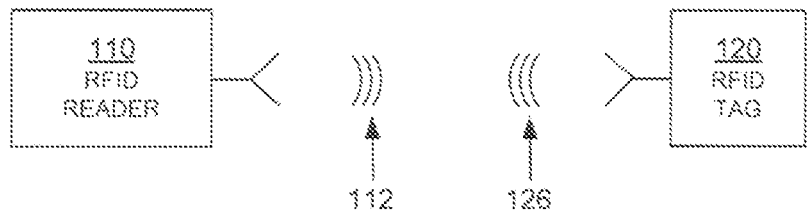
FIG. 1 is a block diagram of components of an RFID system.

FIG. 1 is a diagram of the components of a typical RFID system 100, incorporating embodiments. An RFID reader 110 transmits an interrogating RF signal 112. RFID tag 120 in the vicinity of RFID reader 110 senses interrogating RF signal 112 and generate signal 126 in response. RFID reader 110 senses and interprets signal 126. The signals 112 and 126 may include RF waves and/or non-propagating RF signals (e.g., reactive near-field signals).

Reader 110 and tag 120 communicate via signals 112 and 126. When communicating, each encodes, modulates, and transmits data to the other, and each receives, demodulates, and decodes data from the other. The data can be modulated onto, and demodulated from, RF waveforms. The RF waveforms are typically in a suitable range of frequencies, such as those near 900 MHz, 13.56 MHz, and so on.

The communication between reader and tag uses symbols, also called RFID symbols. A symbol can be a delimiter, a calibration value, and so on. Symbols can be implemented for exchanging binary data, such as "0" and "1", if that is desired. When symbols are processed by reader 110 and tag 120 they can be treated as values, numbers, and so on.

Tag 120 can be a passive tag, or an active or battery-assisted tag (i.e., a tag having its own power source). When tag 120 is a passive tag, it is powered from signal 112.

Figure 2:
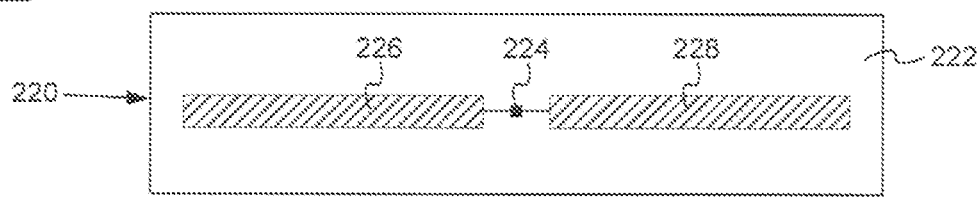
FIG. 2 is a diagram showing components of a passive RFID tag, such as a tag that can be used in the system of FIG. 1.
Figure 2:
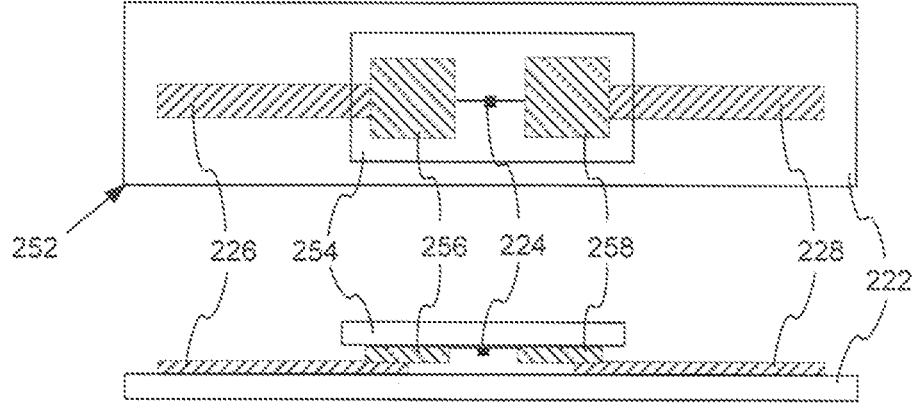
Figure 2:
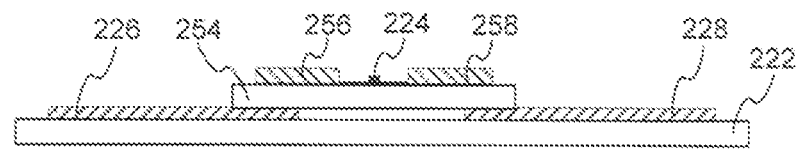

FIG. 2 is a diagram of an RFID tag 220, which may function as tag 120 of FIG. 1. Tag 220 is drawn as a passive tag, meaning it does not have its own power source. Much of what is described in this document, however, applies also to active and battery-assisted tags.

Tag 220 is typically (although not necessarily) formed on a substantially planar inlay 222, which can be made in many ways known in the art. Tag 220 includes a circuit which may be implemented as an IC 224. In some embodiments IC 224 is implemented in complementary metal-oxide semiconductor (CMOS) technology. In other embodiments IC 224 may be implemented in other technologies such as bipolar junction transistor (BJT) technology, metal-semiconductor field-effect transistor (MESFET) technology, and others as will be well known to those skilled in the art. IC 224 is arranged on inlay 222.

Tag 220 also includes an antenna for exchanging wireless signals with its environment. The antenna is often flat and attached to inlay 222. IC 224 is electrically coupled to the antenna via suitable antenna contacts (not shown in FIG. 2). The term "electrically coupled" as used herein may mean a direct electrical connection, or it may mean a connection that includes one or more intervening circuit blocks, elements, or devices. The "electrical" part of the term "electrically coupled" as used in this document shall mean a coupling that is one or more of ohmic/galvanic, capacitive, and/or inductive.

IC 224 is shown with a single antenna port, comprising two antenna contacts electrically coupled to two antenna segments 226 and 228 which are shown here forming a dipole. Many other embodiments are possible using any number of ports, contacts, antennas, and/or antenna segments.

Diagram 250 depicts top and side views of tag 252, formed using a strap. Tag 252 differs from tag 220 in that it includes a substantially planar strap substrate 254 having strap contacts 256 and 258. IC 224 is mounted on strap substrate 254 such that the antenna contacts on IC 224 electrically couple to strap contacts 256 and 258 via suitable connections (not shown). Strap substrate 254 is then placed on inlay 222 such that strap contacts 256 and 258 electrically couple to antenna segments 226 and 228. Strap substrate 254 may be affixed to inlay 222 via pressing, an interface layer, one or more adhesives, or any other suitable means.

Diagram 260 depicts a side view of an alternative way to place strap substrate 254 onto inlay 222. Instead of strap substrate 254's surface, including strap contacts 256/258, facing the surface of inlay 222, strap substrate 254 is placed with its strap contacts 256/258 facing away from the surface of inlay 222. Strap contacts 256/258 can then be either capacitively coupled to antenna segments 226/228 through strap substrate 254, or conductively coupled using a through-via which may be formed by crimping strap contacts 256/258 to antenna segments 226/228. In some embodiments the positions of strap substrate 254 and inlay 222 may be reversed, with strap substrate 254 mounted beneath strap substrate 222 and strap contacts 256/258 electrically coupled to antenna segments 226/228 through inlay 222. Of course, in yet other embodiments strap contacts 256/258 may electrically couple to antenna segments 226/228 through both inlay 222 and strap substrate 254.

In operation, the antenna receives a signal and communicates it to IC 224, which both harvests power and responds if appropriate, based on the incoming signal and the IC's internal state. If IC 224 uses backscatter modulation then it responds by modulating the antenna's reflectance, which generates response signal 126 from signal 112 transmitted by the reader. Electrically coupling and uncoupling the antenna contacts of IC 224 can modulate the antenna's reflectance, as can varying the admittance of a shunt-connected circuit element which is coupled to the antenna contacts. Varying the impedance of a series-connected circuit element is another means of modulating the antenna's reflectance.

In the embodiments of FIG. 2, antenna segments 226 and 228 are separate from IC 224. In other embodiments the antenna segments may alternatively be formed on IC 224. Tag antennas according to embodiments may be designed in any form and are not limited to dipoles. For example, the tag antenna may be a patch, a slot, a loop, a coil, a horn, a spiral, a monopole, microstrip, stripline, or any other suitable antenna.

The components of the RFID system of FIG. 1 may communicate with each other in any number of modes. One such mode is called full duplex. Another such mode is called half-duplex, and is described below.

Figure 3:
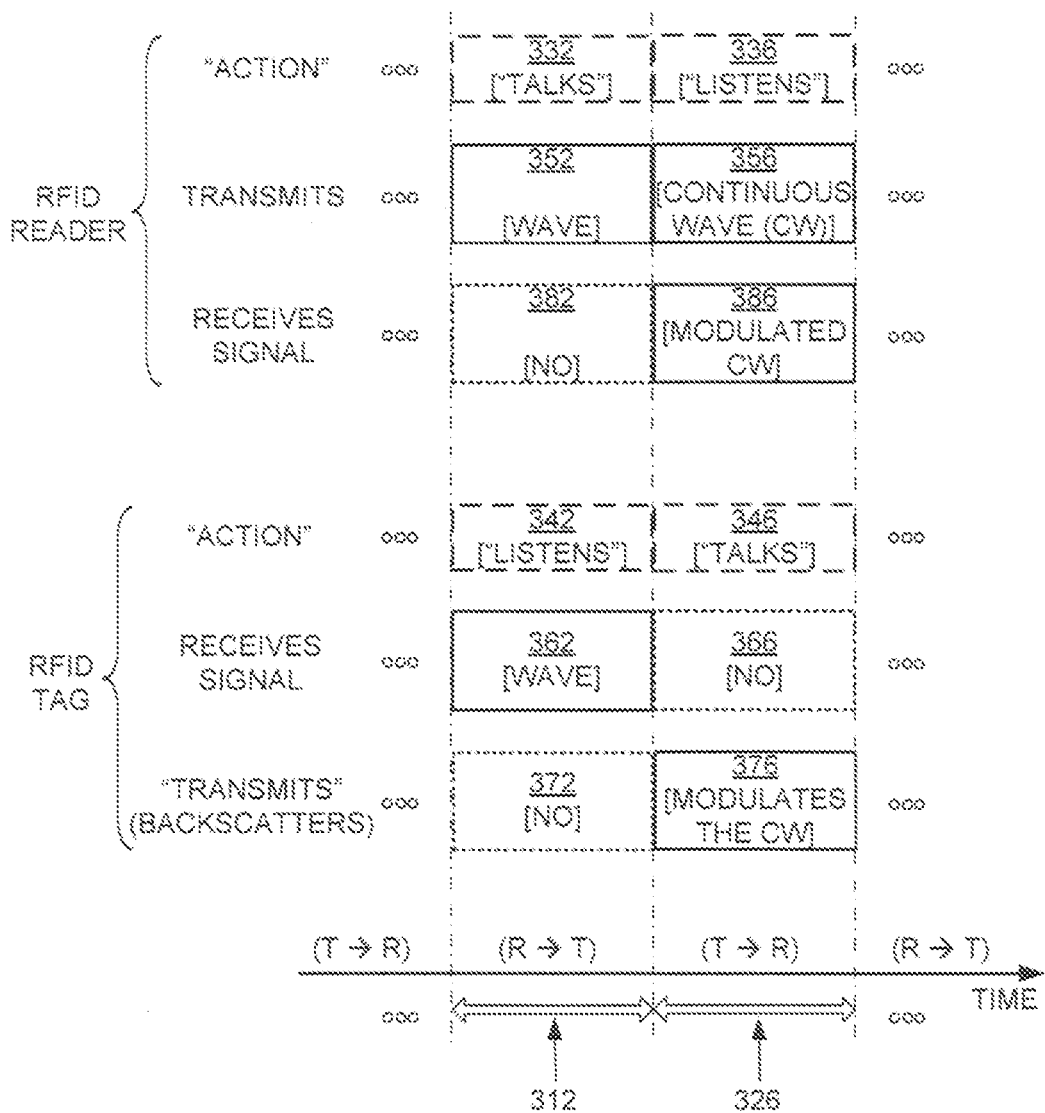
FIG. 3 is a conceptual diagram for explaining a half-duplex mode of communication between the components of the RFID system of FIG. 1.

FIG. 3 is a conceptual diagram 300 for explaining half-duplex communications between the components of the RFID system of FIG. 1, in this case with tag 120 implemented as passive tag 220 of FIG. 2. The explanation is made with reference to a TIME axis, and also to a human metaphor of "talking" and "listening". The actual technical implementations for "talking" and "listening" are now described.

RFID reader 110 and RFID tag 120 talk and listen to each other by taking turns. As seen on axis TIME, when reader 110 talks to tag 120 the communication session is designated as "R→T", and when tag 120 talks to reader 110 the communication session is designated as "T→R". Along the TIME axis, a sample R→T communication session occurs during a time interval 312, and a following sample T→R communication session occurs during a time interval 326. Of course interval 312 is typically of a different duration than interval 326—here the durations are shown approximately equal only for purposes of illustration.

According to blocks 332 and 336, RFID reader 110 talks during interval 312, and listens during interval 326. According to blocks 342 and 346, RFID tag 120 listens while reader 110 talks (during interval 312), and talks while reader 110 listens (during interval 326).

In terms of actual behavior, during interval 312 reader 110 talks to tag 120 as follows. According to block 352, reader 110 transmits signal 112, which was first described in FIG. 1. At the same time, according to block 362, tag 120 receives signal 112 and processes it to extract data and so on. Meanwhile, according to block 372, tag 120 does not backscatter with its antenna, and according to block 382, reader 110 has no signal to receive from tag 120.

During interval 326, tag 120 talks to reader 110 as follows. According to block 356, reader 110 transmits a Continuous Wave (CW) signal, which can be thought of as a carrier that typically encodes no information. This CW signal serves both to transfer energy to tag 120 for its own internal power needs, and also as a carrier that tag 120 can modulate with its backscatter. Indeed, during interval 326, according to block 366, tag 120 does not receive a signal for processing. Instead, according to block 376, tag 120 modulates the CW emitted according to block 356 so as to generate backscatter signal 126. Concurrently, according to block 386, reader 110 receives backscatter signal 126 and processes it.

FIG. 4 is a block diagram showing a detail of an RFID IC, such as IC 224 in FIG. 2. Electrical circuit 424 in FIG. 4 may be formed in an IC of an RFID tag, such as tag 220 of FIG. 2. Circuit 424 has a number of main components that are described in this document. Circuit 424 may have a number of additional components from what is shown and described, or different components, depending on the exact implementation.

Circuit 424 shows two antenna contacts 432, 433, suitable for coupling to antenna segments such as segments 226 and 228 of RFID tag 220 of FIG. 2. When two antenna contacts form the signal input from, and signal return to, an antenna, they are often referred-to as an antenna port. Antenna contacts 432, 433 may be made in any suitable way, such as from metallic pads and so on. In some embodiments circuit 424 uses more than two antenna contacts, especially when tag 220 has more than one antenna port and/or more than one antenna.

Circuit 424 also includes signal-routing section 435 which may include signal wiring, a receive/transmit switch that can selectively route a signal, and so on.

Circuit 424 also includes a rectifier and PMU (Power Management Unit) 441 that harvests energy from the RF signal received by an antenna to power the circuits of IC 424 during either or both reader-to-tag (R→T) and tag-to-reader (T→R) sessions. Rectifier and PMU 441 may be implemented in any way known in the art.

Circuit 424 additionally includes a demodulator 442 that demodulates the RF signal received via antenna contacts 432, 433. Demodulator 442 may be implemented in any way known in the art, for example including a slicer, an amplifier, and so on.

Circuit 424 further includes a processing block 444 that receives the output from demodulator 442 and performs operations such as command decoding, memory interfacing, and so on. In addition, processing block 444 may generate an output signal for transmission. Processing block 444 may be implemented in any way known in the art, for example by combinations of one or more of a processor, memory, decoder, encoder, and so on.

Circuit 424 additionally includes a modulator 446 that modulates an output signal generated by processing block 444. The modulated signal is transmitted by driving antenna contacts 432, 433, and therefore driving the load presented by the coupled antenna segment or segments. Modulator 446 may be implemented in any way known in the art, for example including a switch, driver, amplifier, and so on.

In one embodiment, demodulator 442 and modulator 446 may be combined in a single transceiver circuit. In another embodiment modulator 446 may modulate a signal using backscatter. In another embodiment modulator 446 may include an active transmitter. In yet other embodiments demodulator 442 and modulator 446 may be part of processing block 444.

Circuit 424 additionally includes a memory 450 to store data 452. At least a portion of memory 450 is preferably implemented as a Nonvolatile Memory (NVM), which means that data 452 is retained even when circuit 424 does not have power, as is frequently the case for a passive RFID tag.

In some embodiments, particularly in those with more than one antenna port, circuit 424 may contain multiple demodulators, rectifiers, PMUs, modulators, processing blocks, and/or memories.

In terms of processing a signal, circuit 424 operates differently during a R→T session and a T→R session. The different operations are described below, in this case with circuit 424 representing an IC of an RFID tag.

FIG. 5A shows version 524-A of components of circuit 424 of FIG. 4, further modified to emphasize a signal operation during a R→T session during time interval 312 of FIG. 3. Demodulator 442 demodulates an RF signal received from antenna contacts 432, 433. The demodulated signal is provided to processing block 444 as C_IN. In one embodiment, C_IN may include a received stream of symbols.

Version 524-A shows as relatively obscured those components that do not play a part in processing a signal during a R→T session. Rectifier and PMU 441 may be active, such as for converting RF power. Modulator 446 generally does not transmit during a R→T session, and typically does not interact with the received RF signal significantly, either because switching action in section 435 of FIG. 4 decouples modulator 446 from the RF signal, or by designing modulator 446 to have a suitable impedance, and so on.

Although modulator 446 is typically inactive during a R→T session, it need not be so. For example, during a R→T session modulator 446 could be adjusting its own parameters for operation in a future session, and so on.

FIG. 5B shows version 524-B of components of circuit 424 of FIG. 4, further modified to emphasize a signal operation during a T→R session during time interval 326 of FIG. 3. Processing block 444 outputs a signal C_OUT. In one embodiment, C_OUT may include a stream of symbols for transmission. Modulator 446 then modulates C_OUT and provides it to antenna segments such as segments 226 and 228 of RFID tag 220 via antenna contacts 432, 433.

Version 524-B shows as relatively obscured those components that do not play a part in processing a signal during a T→R session. Rectifier and PMU 441 may be active, such as for converting RF power. Demodulator 442 generally does not receive during a T→R session, and typically does not interact with the transmitted RF signal significantly, either because switching action in section 435 of FIG. 4 decouples demodulator 442 from the RF signal, or by designing demodulator 442 to have a suitable impedance, and so on.

Although demodulator 442 is typically inactive during a T→R session, it need not be so. For example, during a T→R session demodulator 442 could be adjusting its own parameters for operation in a future session, and so on.

In typical embodiments, demodulator 442 and modulator 446 are operable to demodulate and modulate signals according to a protocol, such as Version 1.2.0 of the Class-1 Generation-2 UHF RFID Protocol for Communications at 860 MHz-960 MHz ("Gen2 Specification") by EPCglobal, Inc., which is hereby incorporated by reference in its entirety. In embodiments where circuit 424 includes multiple demodulators and/or modulators, each may be configured to support different protocols or different sets of protocols. A protocol specifies, in part, symbol encodings, and may include a set of modulations, rates, timings, or any other parameter associated with data communications.

Figure 6:
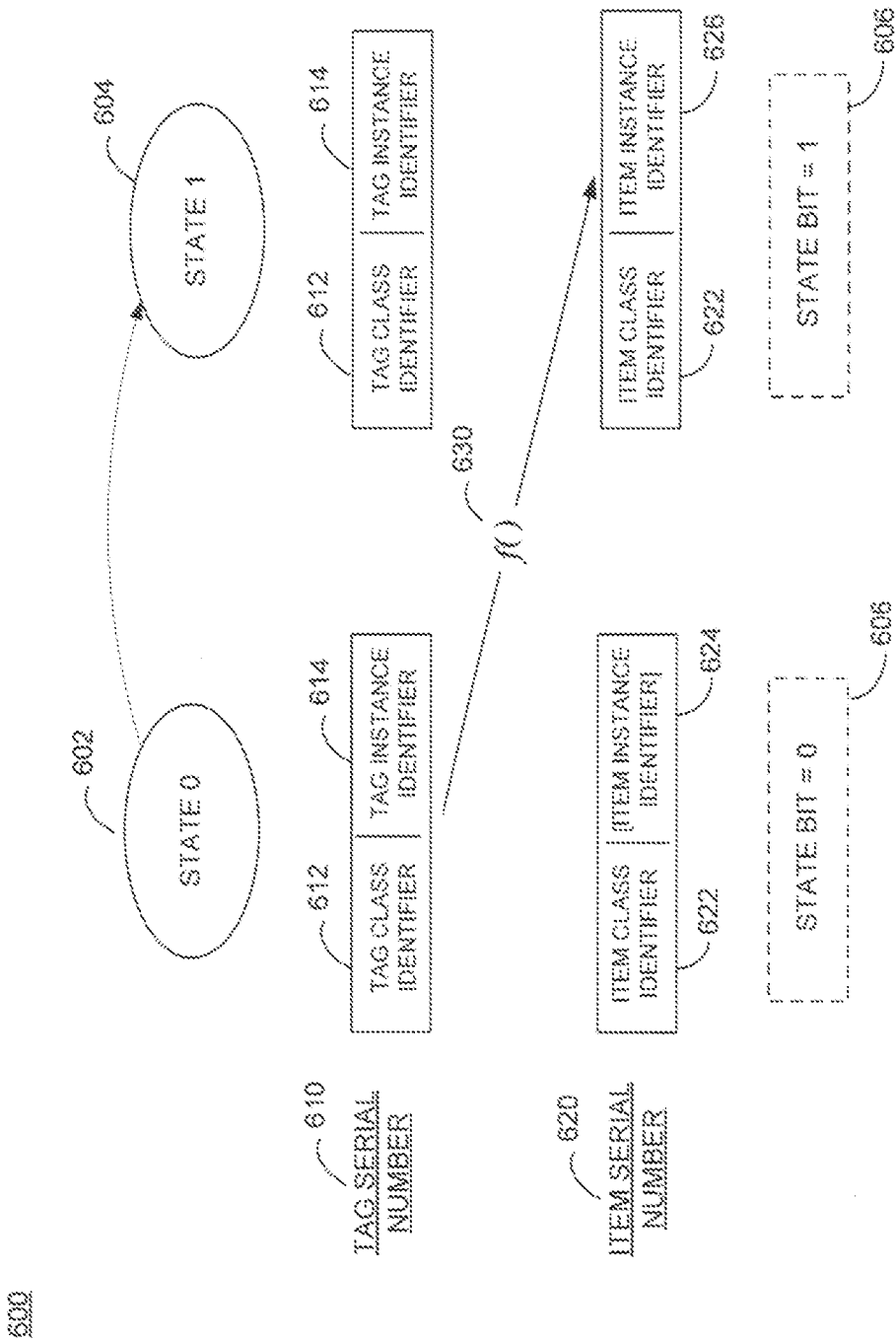
FIG. 6 is a diagram of tag IC states before and after self-serialization according to embodiments.

FIG. 6 is a diagram 600 of RFID tag states before and after self-serialization according to embodiments. An RFID tag attached to an item may store in volatile or nonvolatile memory a tag serial number (TSN) 610 and an item serial number (ISN) 620. TSN 610 is a number that may be unique, may be used to identify the tag IC, and is typically written into IC memory during IC manufacturing. Each tag IC in an operating environment preferably has a different TSN 610 so that individual tag ICs can be differentiated from each other. ISN 620 is a number stored on the tag that identifies the item to which the tag is attached. ISN 620 is typically written at or around the time that the tag is associated with its host item. Each item in an operating environment preferably has a different ISN 620 so that individual items can be differentiated from each other. As one example, TSN 610 may include a tag identifier (TID) and ISN 620 may include an electronic product code (EPC), a universal product code (UPC), or a stock-keeping unit (SKU) number.

TSN 610 may be subdivided into at least a tag class identifier (TCI) 612, which may denote the IC class or type and may be common to multiple ICs, and a tag instance identifier (TII) 614 which is typically unique (at least for a period of time) and identifies a particular IC in the IC class by its serialization. In some instances, for example ones in which tags with different TCIs are not mixed, TCI 612 may be null. In other instances each IC class, make, or model may have a different TCI 612, and all tags of that class, make, or model may share the same TCI 612. TII 614 allows differentiating individual tags within that class, make, or model from each other. As described above, the tag or the IC manufacturer typically store TCI 612 and TII 614 on the tag IC at the time of IC manufacture or soon after.

ISN 620 is at least subdivided into an item class identifier (ICI) 622, which identifies the class of item to which the tag is attached and may be common to multiple items, and an item instance identifier (III) 624 which may be null, unwritten, or invalid (as indicated by braces [ ] in FIG. 6) until the ISN is serialized. III 624, once serialized as III 626, is typically unique (at least for a period of time) and identifies an item in the class by its serialization. In some instances, for example ones in which tags with different ICIs are not mixed, ICI 622 may be null. In other instances each item class may have a different ICI 622, and all items of that class share the same ICI 622. III 626 allows particular items within that item class to be differentiated from each other. For example, ICI 622 may identify an item class such as diapers and III 626 may identify a particular box of diapers.

As described above, ICI 622 and III 626 are typically written at or around the time that the tag is associated with its host item. Typically, a system integrator or end-user generates ISN 620, stores it on the tag IC, and applies the tag to its host item. This ISN-generation process may be slow, time-consuming, and require number-management systems to generate, assign, and keep track of the assigned ISNs, particularly because each III should preferably be unique. Ensuring III uniqueness across multiple factories that manufacture the same type of item, and across multiple retailers when they need to replace a lost or damaged tag and generate a new III for an item, is a daunting task even if the uniqueness need be guaranteed only for a period of time, because that time period is typically measured in at least weeks, and more often months or years.

In a system according to embodiments, a tag may self-generate its III from its TSN. In some embodiments a tag may self-generate the III upon expiration of a timer, automatically upon IC power-up, in response to a reader command, automatically prior to backscattering the ISN to a reader, or upon the processing block performing an operation that uses the ISN. The III may be self-generated when the IC is manufactured, when the tag is manufactured (i.e., when the IC is attached to the tag), when a label containing the tag is manufactured (i.e., when the IC-tag combination is inserted into a label, or when a label having a tag is printed), or when the tag is associated (e.g., attached) to an item. In some embodiments multiple tags can be instructed to simultaneously self-generate their IIIs. In some instances, if an III becomes corrupted then a reader can instruct a tag to regenerate the III from the TSN. In some instances a tag stores the self-generated III in NVM. In other instances the tag may store the self-generated III in volatile memory and generate it at power-up, upon reader command, or automatically prior to backscatter. In some instances the tag may not store the III at all and may instead self-generate it from the TSN every time it needs to use or send the III. Regardless of the method, because the tags themselves generate the III, the need for expensive ISN management systems is reduced.

Although it is desirable for each tag and item to have a unique serial number, the limitation of having serial numbers with finite sizes inherently means that at some point there will be duplication. For example, imagine a very simplistic example in which tag ICs of a particular class are manufactured and assigned four-bit TIIs, with the first tag IC assigned a TII of 0000, the second tag IC assigned a TII of 0001, and so on. In this simplistic example there are only sixteen unique TIIs and the TII in the seventeenth tag IC "rolls over", starts back at 0000, and duplication occurs. Therefore, in general, there is a time period during which each tag IC can be guaranteed to have a unique TSN. In many instances this rollover period may be shortened for a variety of reasons, such as because the TII numbering sequence has holes, or because some use cases require allocating "blocks" of TII numbers which may not all get used, or for a host of other reasons. Regardless, uniqueness cannot be guaranteed for all time (but can typically be guaranteed for a sufficiently long time so as not to impact the use case or application). The same is true of ISNs.

In FIG. 6, a tag that has not yet been serialized is in state 0 (602) in which TSN 610 (comprising TCI 612 and TII 614) has been stored in the IC. However, the ISN 620 is incomplete. In some embodiments, a tag in state 0 has ICI 622 stored in the IC, but not III 624 which may be null, unwritten, may contain an "unserialized" code, or may be in any other unprogrammed state as will be obvious to those skilled in the art. In some embodiments a tag also stores a state bit 606 whose value indicates the tag state (i.e., whether the ISN has been serialized).

Upon a triggering event, which may be a reader command, a tag power-up, a timer expiration, a processing block 444 event, a request for or a need to backscatter an ISN, a need to calculate a cyclic redundancy check (CRC) over the ISN, a need to encrypt the ISN, receiving a signal from a reader, or any other event that requires the tag to possess a serialized ISN, a tag in state 0 transitions to state 1 (604). In state 1, TSN 610 and ICI 622 remain unchanged relative to state 0, but the tag self-generates III 626 by applying a function 630 to at least a portion of TSN 610. Function 630 may be as simple as a direct copy (i.e., copy a portion of TSN 610 into III 626), an indexed copy (i.e. copy starting at a pointer location), or may include a complex algorithm for deriving or determining an III from TSN 610. In some embodiments function 630 may derive III 626 from TII 614. In other embodiments function 630 may derive III 626 from the entire TSN 610. The self-serialization may also cause the tag to assert state bit 606 to indicate that the tag's ISN has been serialized.

Figure 7:
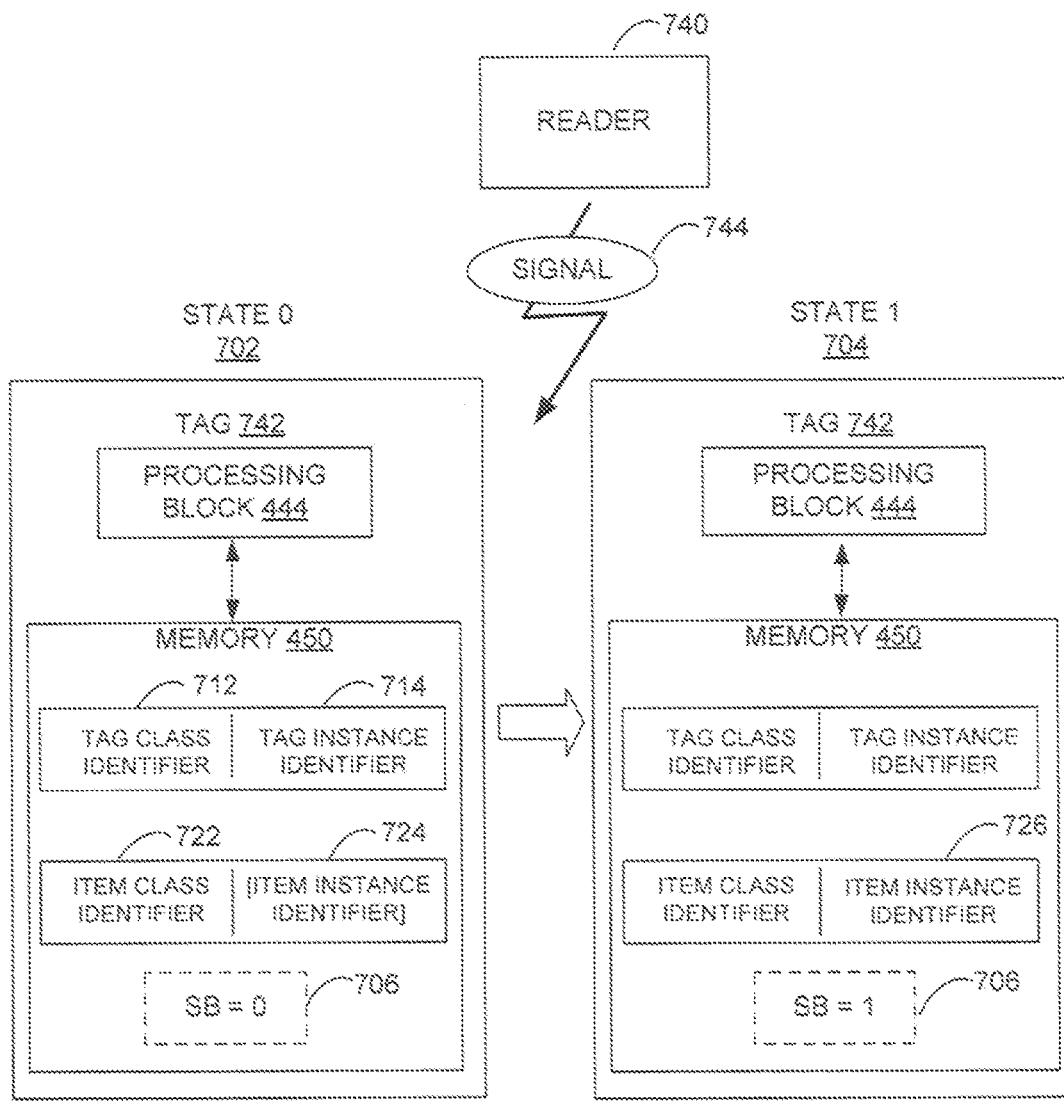
FIG. 7 is a diagram of an RFID system 700 configured to implement tag IC self-serialization according to embodiments.

FIG. 7 is a diagram of an RFID system 700 configured to implement tag self-serialization as described above in relation to FIG. 6, according to embodiments. RFID system 700 includes a reader 740 and at least one RFID tag 742 attached to an item (item not shown). RFID tag 742 includes an IC with a processing block 444 and a memory 450, similar to processing block 444 and memory 450 in FIG. 4. Memory 450 may include volatile and/or nonvolatile memory and is configured to store a TSN comprising a TCI 712 and a TII 714, and an ISN comprising an ICI 722 and an III 726.

RFID tag 742 begins in state 0 (702), similar to state 0 (602) in FIG. 6. In state 0 the IC already has a TSN stored in memory 450. The IC may already have an ICI 722 stored in memory 450, but III 724 either has not been stored, may need to be updated, or in use cases for which user privacy is an issue may need to be changed to prevent consumer tracking. Memory 450 may also store an optional state bit 706 whose value indicates whether tag 742 has been serialized.

At some point reader 740 may transmit a signal 744 to tag 742 instructing the IC to self-serialize. The signal may be merely providing RF power to the tag. If the signal is a command then the command may be explicit, in that it explicitly instructs the tag to self-serialize, or may be implicit, in that it requests the tag to perform an operation that requires a serialized ISN (e.g. an inventory command like a Query or a Read command that attempts to read the serialized ISN) in response to which the tag self-serializes prior to executing the implicit command. In either case processing block 444 in tag 742 applies a function (similar to function 630 in FIG. 6) to the TSN (to the TCI 712, the TII 714, or both) to self-generate III 726. Processing block 444 may store the generated III 726 in memory 450 and may assert optional state bit 706 after the self-serialization. IC 742 is now in state 1 (704), similar to state 1 (604) discussed in FIG. 6. If processing block 444 stored the III in volatile memory then the tag IC may likewise store the state bit in volatile memory so that when the IC powers down and loses the III it also deasserts the state bit.

In some embodiments reader 740 may first read tag memory 450 before sending signal 744. After sending signal 744 the reader 740 may verify that the IC has self-generated, written, and optionally locked the correct ISN in memory, and may take corrective action if the tag did not generate the correct data (e.g., resend the command or directly write the III). Tag 742 may also be configured to generate and transmit or store a success message if it has self-generated the ISN, or an error message if it cannot perform the self-serialization.

Figure 8:
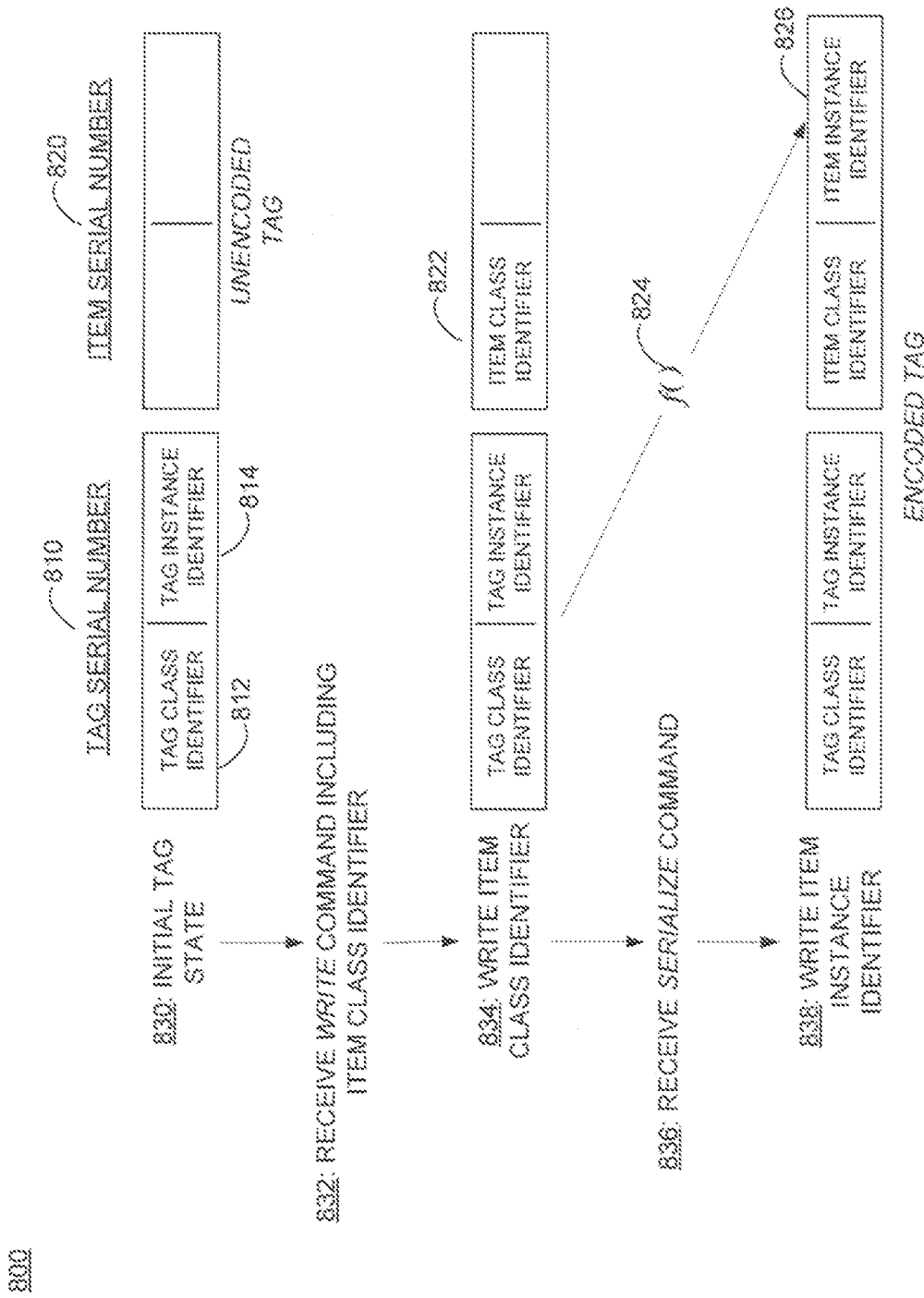
FIG. 8 depicts a tag IC self-serialization process according to embodiments.

FIG. 8 depicts a tag serialization process 800 according to embodiments. The progress of process 800 is tracked in steps 830-838 on the left side of the diagram, with TSN 810 and ISN 820 corresponding to particular steps depicted on the right.

The serialization process 800 begins at step 830, with the tag in an initial state. In the initial tag state TSN 810 (TCI 812 and TII 814) has already been encoded on the tag. However, ISN 820 has not yet been encoded. The tag in step 830 corresponds to the tag in state 0 (602) depicted in FIG. 6, but in which neither ICI 622 nor III 624 have been encoded on the tag.

At steps 832 and 834, the tag receives a write command including an ICI (832) and encodes the received ICI into tag memory (834) as ICI 822. In some embodiments, the write command may include retrieving data from the tag either before or after the command.

At step 836, which may occur before, after, or at the same time as steps 832/834, the tag receives a serialize command. In response, the tag applies function 824 (similar to function 630 in FIG. 6) to at least a portion of TSN 810 to generate an III 826, which it then writes to memory in step 838. In some embodiments the serialize command may be an inventory command or a read command that causes the tag IC to generate the III when it needs it. In some embodiments the tag stores the ICI in NVM and the III in volatile memory.

The write command and/or the serialize command may be a broadcast command which a reader sends to multiple tags simultaneously. For example, a reader may send a write command containing an ICI 822 to multiple tags, causing the multiple tags to all write the ICI 822 to memory. Similarly, the reader may broadcast a serialize command to multiple tags, causing the multiple tags to all generate and store individual IIIs based on their stored TSNs. In some embodiments a reader transmitting CW as in FIG. 3 may cause multiple tags to power up and self-generate IIIs upon power-up.

In some embodiments, after writing ICI 822 and/or III 826, a tag may lock the memory against subsequent writing and thereby prevent ICI 822 and/or III 826 from being subsequently overwritten. The tag may execute the lock in response to the write or serialize command or a different command.

Figure 9:
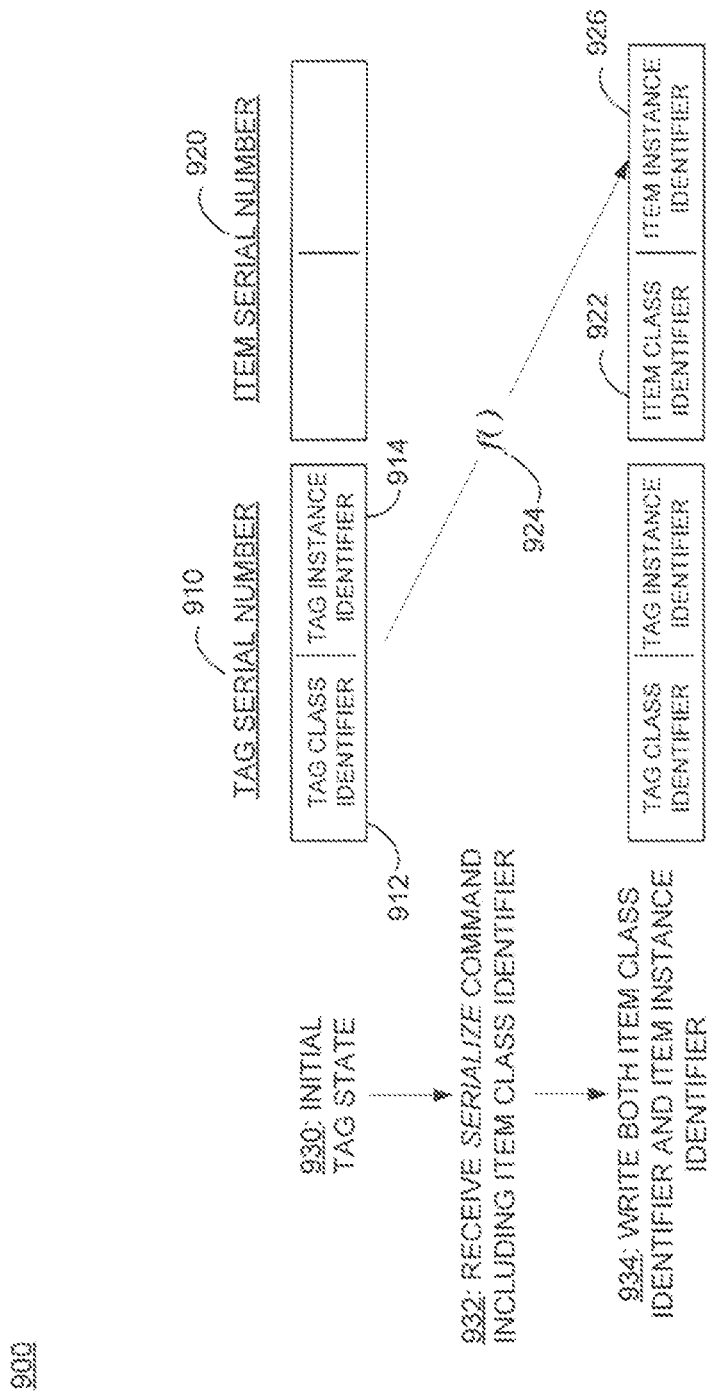
FIG. 9 depicts another tag IC self-serialization process according to embodiments.

In some embodiments a tag may write both the ICI and the III in response to a single command FIG. 9 depicts an example tag serialization process 900 along these lines. As with process 800 described above in relation to FIG. 8, the progress of process 900 is tracked downward in steps 930-934 along the left side of the diagram, with TSN 910 and ISN 920 corresponding to particular steps depicted on the right.

Tag serialization process 900 begins at step 930, similar to step 830 in FIG. 8, where the tag is in an initial tag state with an already-encoded TSN 910 and unencoded ISN 920. In step 932, the tag receives a serialize command including an ICI 922. The serialize command instructs the tag to generate an III from TSN 910 and to write both the received ICI and the generated III into memory. In response the tag generates III 926 by applying a function 924 to at least a portion of TSN 910 and writes the received ICI 922 and generated III 926 into memory. As with process 800 of FIG. 8, the tag may also optionally lock the memory after writing. Also, as with process 800 of FIG. 8, the serialize command in step 932 may be broadcast simultaneously to multiple tags, each of which then perform step 934, or all or a portion of the steps—write the ICI, self-serialize the III, and lock the ISN. Finally, whereas the ICI will typically be stored in NVM, the III may be stored either in NVM, volatile memory, registers, or even fleetingly in logic circuits that produce the III and send it to a reader.

Embodiments also include methods. Some are methods performed by an RFID tag. These methods can be implemented in any number of ways, including using the structures described in this document. One such way is by machine operations, of devices of the type described in this document. Another way is for one or more of the individual operations to be performed by one or more human operators. These human operators need not be collocated with each other, but each can be with a machine that performs a portion of a program or operation.

Figure 10:
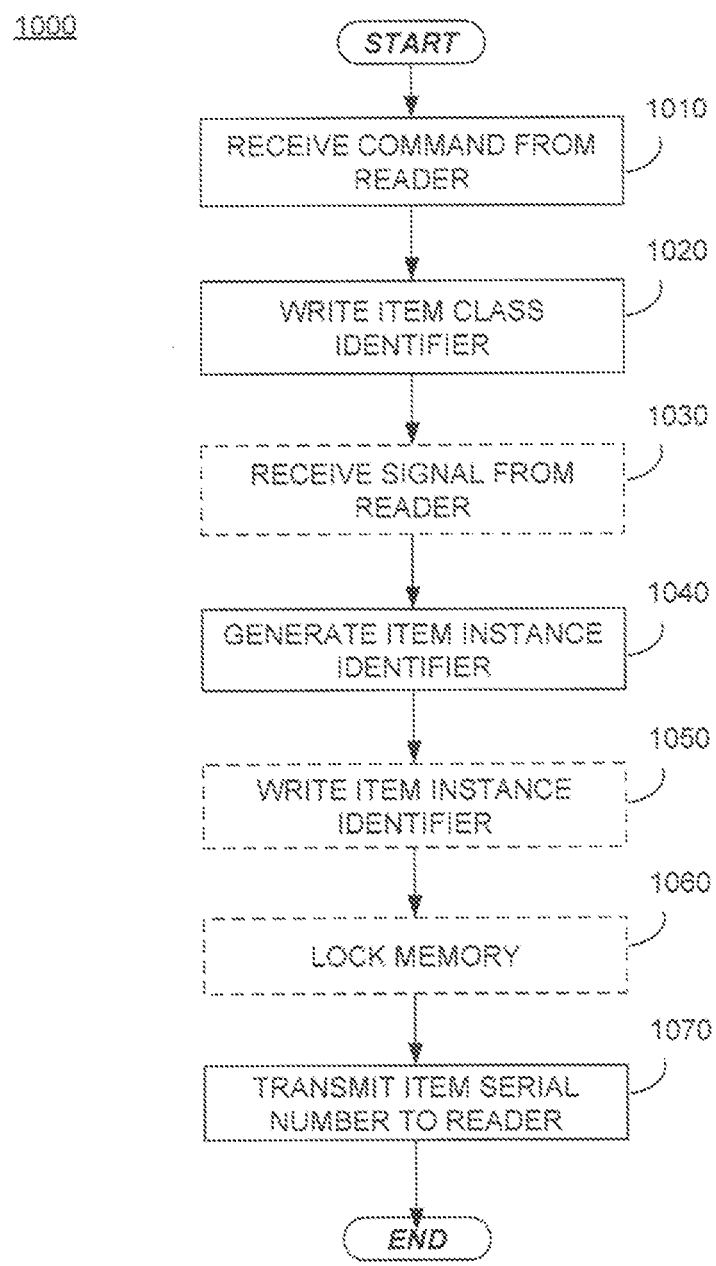
FIG. 10 is a flowchart of a tag IC self-serialization process according to embodiments.

FIG. 10 is a flowchart of a tag self-serialization process 1000 according to embodiments. In step 1010 an RFID tag receives a command containing at least a portion of an ICI. In response, at step 1020, the tag writes an ICI to tag memory. At step 1030 the tag optionally receives a signal, either from the same reader as in step 1010 or from a different reader. In some embodiments this signal may be a serialize command instructing the tag to self-generate and store an III. In other embodiments this signal may be an inventory command or a read command for which the tag generates an III with which to respond. In yet other embodiments this signal may be RF power, such as a CW wave as in FIG. 3, to which the tag IC powers-up and self-generates an III to use while the tag is powered. In yet other embodiments this signal may cause the tag to generate a new III different from a prior III, which may make tracking the tag difficult so as to protect consumer privacy.

In step 1040 the tag generates an III by applying an algorithm or function to at least a portion of a TSN already stored on the tag. The generation may be in response to the command in step 1010, the signal in step 1030, or in response to another trigger event altogether. The algorithm or function may be wholly or partially included in the command or signal, or may be already known to the tag IC. In optional step 1050 the tag writes the generated III to volatile or nonvolatile tag memory. This write step is optional because in some instances the tag may generate the III in step 1040, transmit it in step 1070 (see below), and then discard it.

In optional step 1060 the tag may lock the memory containing the ICI, III, or both, to prevent subsequent overwriting. Finally, in step 1070 the tag transmits the ISN containing the ICI and the self-generated III to a reader, either in response to the command in step 1010, the signal in step 1030, or responsive to another event altogether.

As described above, in some embodiments at least part of the ISN is generated from the TSN based on a function (e.g., functions 630, 824, and 924 in FIGS. 6, 8, and 9, respectively). The function may vary in complexity, from a direct or indexed copy mechanism to a complex algorithm. In some embodiments, the function may also be or include one or more cryptographic functions or algorithms used for tag authentication (i.e. determining whether a tag is authentic or counterfeit).

Figure 11:
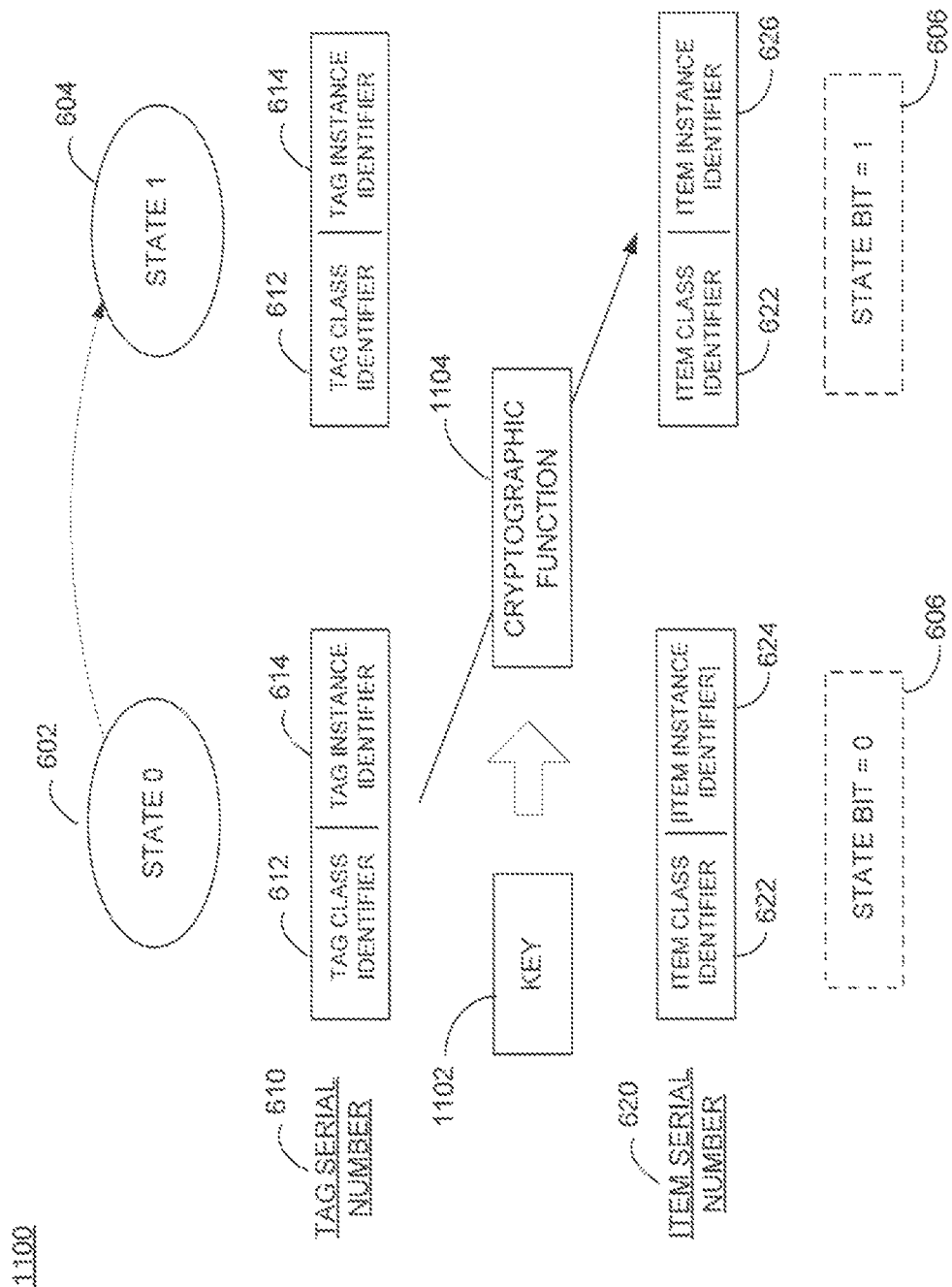
FIG. 11 is a diagram of tag IC states before and after serialization using a cryptographic function according to embodiments.

FIG. 11 is a diagram 1100 of RFID tag IC states before and after serialization using a cryptographic function according to embodiments. Diagram 1100 is similar to diagram 600 in FIG. 6. However, in diagram 1100, a cryptographic function 1104 generates ISN 620 (or a portion of ISN 620, such as III 626) from TSN 610 (or a portion of TSN 610, such as TII 614) and a key 1102. In some embodiments cryptographic function 1104 will generate III 626 from TII 614 and key 1102. Cryptographic function 1104 may implement one or more hashing or cryptographic algorithms such as a cryptographic hash function (e.g., hash-based message authentication code or HMAC), a symmetric cryptographic algorithm (e.g., Advanced Encryption Standard or AES) and/or an asymmetric cryptographic algorithm (e.g., Rivest/Shamir/Adleman or RSA). Key 1102, which is usually kept secret, may be associated with a signing or certification authority such as a tag manufacturer, a tag distributor, a product manufacturer, a retailer, or any other suitable entity. Key 1102 may be stored in the tag IC, on a reader, or in a network-accessible processor or processing device. Consequently, generated ISN 620 may serve as both a traditional ISN and as a digital signature which indicates that an appropriate entity has certified the authenticity of the tag and/or the item associated with the tag.

A digital signature allows verifying the authenticity and in many instances also the integrity of a digital message. When referred-to in the context of asymmetric cryptography, a verified digital signature gives the recipient reason to believe that the message was created by a known sender and not subsequently altered. In typical embodiments, a signatory or sender possesses a private/public key pair in which the private and public keys are mathematically related to each other. The signatory uses the private key when generating the digital signature. A recipient uses the signatory's public key to verify the digital signature.

Message authentication codes (MAC) are the symmetric-cryptography equivalent of a digital signature. A signatory or sender possesses a key which it uses to generate the MAC. A recipient can use the same key to verify the MAC. A verified MAC gives the recipient reason to believe that the message was created by a known signatory. The term "digital signature" used in this disclosure may refer to a digital signature generated using asymmetric cryptography, to a MAC generated using symmetric cryptography, or to another cryptographic functionality that allows a recipient to verify the authenticity of a message or code.

Figure 12:
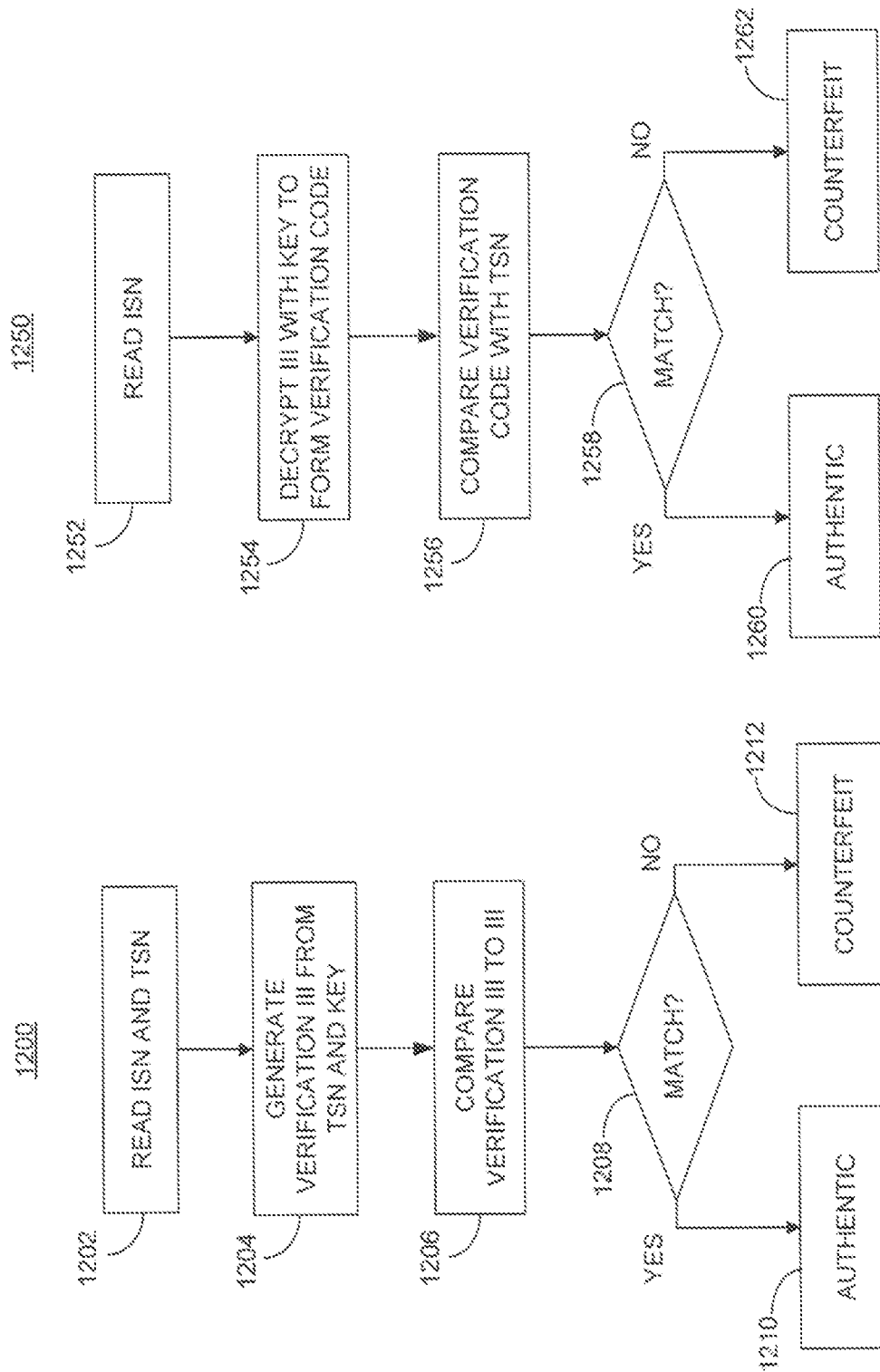
FIG. 12 are flowcharts of tag authentication processes according to embodiments.

A recipient or other party that knows the public key associated with private key 1102 (for an asymmetric cryptographic algorithm) or that knows key 1102 (for a symmetric cryptographic algorithm), and that knows the cryptographic algorithm used to generate the III or ISN, may authenticate ISN 620. FIG. 12 depict flowcharts of tag authentication processes 1200 and 1250 according to embodiments. Tag authentication process 1200, typically used with symmetric cryptographic algorithms, begins with step 1202, in which an RFID reader reads a tag's ISN (e.g., ISN 620 in FIG. 11) and TSN (e.g., TSN 610 or a portion of TSN 610). Subsequently, a verification III is generated based on the TSN and key in step 1204. In step 1206 the III from the ISN is compared with the verification III. If the IIIs match in step 1208 then the ISN is likely authentic (step 1210). If the IIIs do not match then the ISN is likely counterfeit (step 1212).

Tag authentication process 1250, typically used with both symmetric and asymmetric cryptographic algorithms, is similar to process 1200. In step 1252, an RFID reader reads a tag's ISN (e.g., ISN 620 in FIG. 11). Subsequently, the III from the ISN is decrypted using the key in step 1254 to form a verification code. In step 1256 the verification code is compared to the TSN. If the comparison matches in step 1258 then the ISN is likely authentic (step 1210). If the comparison does not match then the ISN likely counterfeit (step 1212).

As noted above, the III may be a portion of the ISN or may form the entirety of the ISN. As will become clear from FIG. 13, the III may include a subportion indicator and the cryptographic algorithms may use or employ this subportion indicator.

Figure 13:
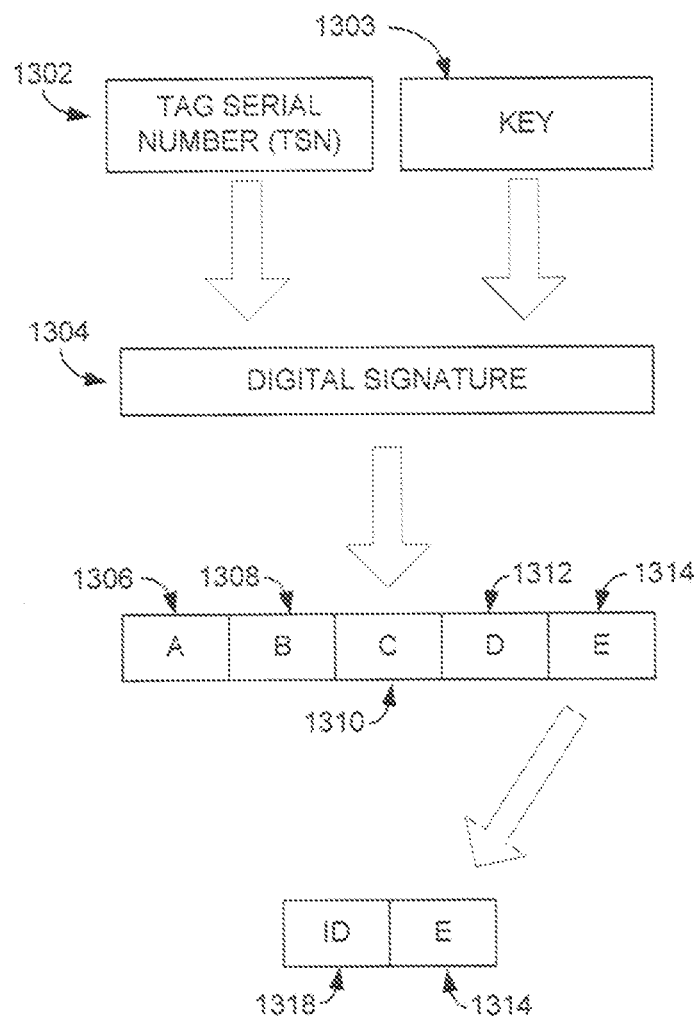
FIG. 13 depicts a tag IC cryptographic serialization process according to embodiments.

In some situations a cryptographic function may generate a digital signature that is longer than the allowable size of a tag's ISN. FIG. 13 depicts a cryptographic serialization process 1300 that addresses this issue, according to embodiments.

Process 1300 generates a shorter ISN from a longer digital signature while preserving security and minimizing ISN duplications. Process 1300 may be performed by an RFID tag, by an RFID reader, and/or by a networked processor. TSN 1302 and key 1303 may be retrieved from a memory (such as a memory of the tag or of a reader), from a command, or from a network. In some instances TSN 1302 and key 1303 will be retrieved from different locations and/or devices.

In process 1300, a digital signature 1304 is first generated from TSN 1302 (e.g., TSN 610 in FIG. 11) and key 1303 by applying a cryptographic function (e.g., function 1104 in FIG. 11). Digital signature 1304 is then subdivided into subportions 1306, 1308, 1310, 1312, and 1314, where the subportions are shorter in length (i.e. have less bits) than digital signature 1304. The subportions may be disjoint, as shown in FIG. 13, or they may be overlapping (i.e. have some bits in common). ISN 620 is then determined by selecting one of the subportions (in FIG. 13, subportion 1314) adding a subportion indicator 1318 to the selected subportion (in this case, the subportion indicator has a value of "5"), and in some instances adding an ICI 622 to form the composite ISN 620. Subportion indicator 1318 identifies the subportion of the digital signature 1304 used in ISN 620. In some embodiments, subportion indicator 1318 may be retrieved from a tag or reader memory, retrieved from a command received by the tag or reader, or retrieved from a remote or network location.

Whereas FIG. 13 shows digital signature 1304 subdivided into five disjoint subportions, in other embodiments a digital signature may be divided into fewer or more subportions, disjoint or overlapping. The number of subportions may be based on the size of digital signature 1304, the allowable III or ISN size, the size of subportion indicator 1318, and/or any other suitable parameter. For example, digital signature 1304 may be divided into subportions such that a subportion concatenated with subportion indicator 1318 has a size equal to the allowable III size. A subportion may have the same size as one or more other subportions, or may differ in size from one or more other subportions.

The size of subportion indicator 1318 is typically based on the number of subportions into which digital signature 1304 is subdivided. For example, if digital signature 1304 is divided into two subportions, subportion indicator 1318 may be a single bit, whereas if digital signature 1304 is divided into eight subportions, subportion indicator 1318 may be three bits.

Which subportion of digital signature 1304 is selected for the ISN 620 may be based on any suitable criterion. For example, the selection process may start with the most significant bits of digital signature 1304, or with the least significant bits, or it may follow another process entirely. In some embodiments, subportion indicator 1318 and subportion 1314 form an entire ISN 620, whereas in some embodiments subportion indicator 1318 and subportion 1314 form III 626.

Figure 14:
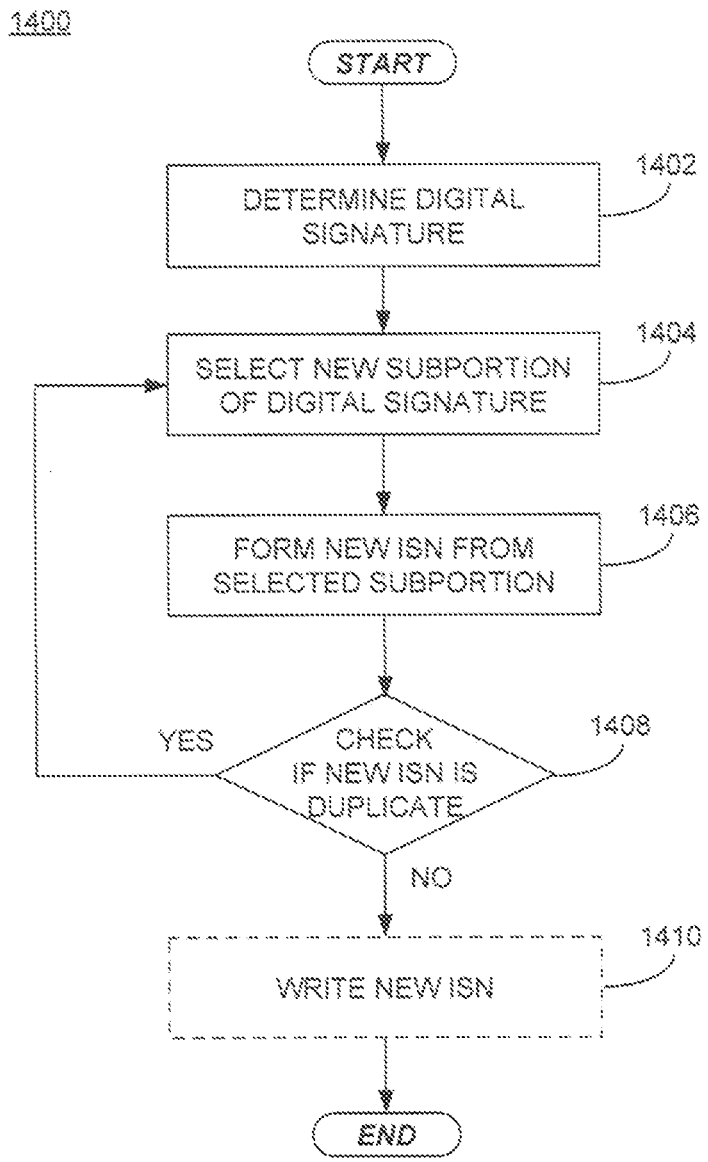
FIG. 14 is a flowchart of a cryptographic serialization process according to embodiments.

FIG. 14 is a flowchart of a cryptographic serialization process 1400 according to embodiments. Process 1400 is similar to process 1300 described above in FIG. 13. In step 1402, a digital signature (e.g., digital signature 1304) is determined using a cryptographic algorithm (e.g., cryptographic function 1104). In step 1404, a subportion 1314 of digital signature 1402 is selected. In step 1406, an ISN is formed from subportion 1314, subportion indicator 1318, and, optionally, ICI 622. In step 1408, the formed ISN is checked to see if it is unique or a duplicate. For example, a reader may compare the new ISN to previously-generated ISNs stored in a local or network database. If the new ISN is unique then in optional step 1410 it may be written to tag memory. If the new ISN is a duplicate then the process reverts to step 1404, where another subportion of the digital signature is selected and used to form a different ISN. The process then continues, as above.

If there are no subportions of digital signature 1304 that generate a unique number then the process may proceed in several ways. It may provide an error notification and end. It may use a different key to generate a different digital signature 1304. It may change the size and number of the subportions. It may reuse one of the prior subportions. It may add a count value to the reused subportion. In some embodiments, at least one of steps 1402-1410 may be performed by the tag, a reader, an external authority connected to a reader, or some combination of the three.

Figure 15:
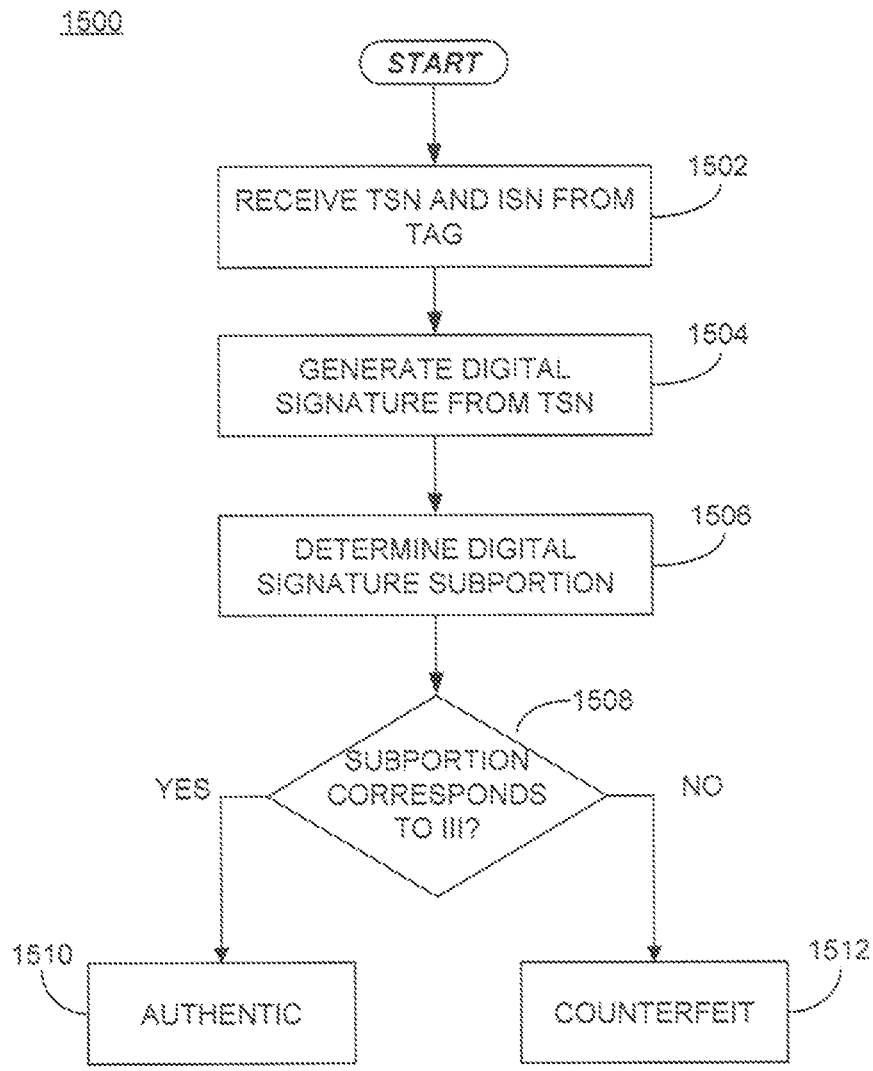
FIG. 15 is a flowchart of another tag authentication process according to embodiments.

FIG. 15 is a flowchart of another tag authentication process 1500 according to embodiments. In step 1502, an RFID reader may read a tag's TSN and ISN (e.g., TSN 610 and ISN 620 in FIG. 6). In step 1504 a key associated with the tag is used to generate a digital signature based on the tag's TSN. In some embodiments, the key may be stored in the reader's local memory. In other embodiments the key may be stored in, used by, or retrieved from a remote location. In step 1506 the subportion of the digital signature corresponding to the tag's ISN is determined. For example, a subportion indicator may be read from the ISN and used to select a subportion of the generated digital signature. In some embodiments, instead of determining a single subportion, many or all of the potential subportions may be generated. In step 1508, a determination is made as to whether digital signature subportion(s) determined in step 1506 correspond to the tag's III. If so, then in step 1510 the ISN may be considered authentic. If not, then in step 1512 the ISN may be considered counterfeit.

If the III is only a subportion of the digital signature then the comparison in step 1508 may not be absolute, meaning that there may be some ambiguity or uncertainty in the final result. Said another way, if the III is only a subportion of the digital signature, then multiple digital signatures may legitimately generate this same III subportion. By using a longer III subportion, or using an III that represents a larger fraction of the digital signature, the magnitude of this uncertainty (or equivalently, the incidence of false positives or false negatives) can be chosen to meet a system performance objective.

The steps described in processes 1000, 1200, 1250, 1400, and 1500 are for illustration purposes only. Serializing an RFID tag, digitally signing an RFID tag, using all or a subportion of a digital signature in an ISN, or authenticating an RFID tag using a digital signature may be performed employing additional or fewer steps and in different orders using the principles described herein. Of course the order of the steps may be modified, some steps eliminated, or other steps added according to other embodiments.

The foregoing detailed description has set forth various embodiments of the devices and/or processes via the use of block diagrams and/or examples. Insofar as such block diagrams and/or examples contain one or more functions and/or aspects, it will be understood by those within the art that each function and/or aspect within such block diagrams or examples may be implemented, according to embodiments formed, individually and/or collectively, by a wide range of hardware, software, firmware, or virtually any combination thereof.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, configurations, antennas, transmission lines, and the like, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations).

Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). It will be further understood that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above. Finally, as will be understood by one skilled in the art, a range includes each individual member.

We claim:

1. A method for digitally signing a Radio Frequency Identification tag, comprising:
   retrieving a tag instance identifier (TII) and a key;
   generating a digital signature from at least the TII and the key;
   selecting a subportion of the digital signature;
   determining a subportion indicator that identifies the selected subportion from a set of two or more subportions of the digital signature; and
   forming an item instance identifier (III) from at least the selected subportion and the subportion indicator.

2. The method of claim 1, further comprising forming an item serial number from an item class identifier (ICI) and the III.

3. The method of claim 2, wherein the ICI is null.

4. The method of claim 1, further including storing the III in an IC of the tag.

5. The method of claim 1, further comprising generating the digital signature using a cryptographic algorithm.

6. The method of claim 1, further comprising one of:
   retrieving the subportion indicator from a memory;
   retrieving the subportion indicator from a command, and
   retrieving the subportion indicator from a network.

7. The method of claim 1, further comprising:
   determining whether the selected subportion of the digital signature is unique; and
   if the selected subportion is not unique then selecting another subportion.

8. The method of claim 7, further comprising referencing a network database to determine whether the selected subportion is unique.

9. The method of claim 1, further comprising forming the III at one of:
   a time of IC manufacture;
   a time of tag manufacture;

a time of label manufacture;
a time when the tag is associated with an item;
expiration of a timer;
a power-up of the tag IC;
upon responding to a reader command;
prior to backscattering an item serial number to a reader; and
a processing block of the tag IC performing an operation.

10. A method for determining the authenticity of a Radio Frequency identification tag at an RFID reader, the method comprising:
receiving a tag instance identifier (TII) and an item instance identifier (III) from the tag;
retrieving a key from one of a memory, a command, and a network;
retrieving a subportion indicator from the II;
generating at least one of:
a verification III by encrypting at least the III with the key and selecting a subportion of the verification III indicated by the subportion indicator; and
a verification code by decrypting at least the Ill with the key and the subportion indicator;
comparing at least one of:
the verification III with the III; and
the verification code with the TII; and
determining the authenticity of the tag based on the comparison.

11. The method of claim 10, further comprising encrypting and decrypting using a cryptographic algorithm.

12. The method of claim 10 wherein the key is one of a public key and a private key.

13. The method of claim 10 wherein the authenticity determination is performed by one of a reader and a networked processor.

14. The method of claim 10, further comprising determining the integrity of the III based on the comparison.

15. A Radio Frequency Identification (RFID) integrated circuit (IC) comprising:
a memory storing a tag instance identifier (TII); and
a processing block configured to:
retrieve the TII and a key;
generate a digital signature from at least the TII and the key;
select a subportion of the digital signature;
determine a subportion indicator that identifies the selected subportion from a set of two or more subportions of the digital signature; and
form an item instance identifier (III) from at least the selected subportion and the subportion indicator.

16. The IC of claim 15, wherein the processing block is further configured to form an item serial number from an item class identifier (ICI) and the III.

17. The IC of claim 15, wherein the processing block is further configured to store the III in the memory.

18. The IC of claim 15, wherein the processing block is further configured to generate the digital signature using a cryptographic algorithm.

19. The IC of claim 15, wherein the processing block is further configured to retrieve the subportion indicator from one of the memory and a command.

20. The IC of claim 15, wherein the processing block is further configured to form the III at one of:
a time of IC manufacture;
a time of tag manufacture;
a time of label manufacture;
a time when the IC is associated with an item;
expiration of a timer;
a power-up of the IC;
upon responding to a reader command;
prior to backscattering an item serial number to a reader; and
upon performing an operation.

* * * * *